United States Patent [19]
Roxbury

[11] Patent Number: 5,718,440
[45] Date of Patent: Feb. 17, 1998

[54] PIPE VICE TRANSPORTATION DOLLY

[76] Inventor: Steven Carl Roxbury, 215 Delano, Allegan, Mich. 49010

[21] Appl. No.: 558,798

[22] Filed: Nov. 15, 1995

[51] Int. Cl.⁶ ..................................................... B62B 1/26
[52] U.S. Cl. .................... 280/47.131; 280/47.24; 280/63; 414/490; 414/908
[58] Field of Search ..................... 280/35, 47.131, 280/47.15, 47.18, 47.24, 47.26, 63, 79.11; 414/490, 908, 446

[56] References Cited

U.S. PATENT DOCUMENTS

| | | | |
|---|---|---|---|
| 1,716,611 | 6/1929 | Wilson | 280/47.18 |
| 2,820,643 | 1/1958 | Cohn | 280/34 |
| 4,220,346 | 9/1980 | Geschwander | 280/47.18 |
| 4,565,382 | 1/1986 | Sherman | 280/47.18 |
| 4,570,960 | 2/1986 | Peetz | 280/47.131 |
| 4,872,694 | 10/1989 | Griesinger | 280/47.131 X |
| 5,123,666 | 6/1992 | Moore | 280/47.18 X |
| 5,248,157 | 9/1993 | Rice | 280/63 X |
| 5,257,892 | 11/1993 | Branch | 414/490 |

OTHER PUBLICATIONS

The Ridge Tool Company, "Ridgid Transporter" Sep. 1955.

*Primary Examiner*—Brian L. Johnson
*Assistant Examiner*—Michael Mar
*Attorney, Agent, or Firm*—John Gugliotta; David L. Volk

[57] ABSTRACT

A pipe vice transportation dolly having a one-piece faceplate which is rigid and stable, and primary and secondary support arms to sustain the pipe vice while providing stability and balance as well. Two wheels protrude from either side and enable it to move the pipe vice about. A face plate is generally triangular and is situated between the wheels with the main support arm centered in the peak of the triangle, and two protruding pipes, secondary support arms, on each end of the plate which attach to the pipe vice. A rectangular handle is situated on top and center of the faceplate.

7 Claims, 2 Drawing Sheets

PIPE VICE TRANSPORTATION DOLLY

BACKGROUND OF THE INVENTION

1. Field of the Invention

The present invention relates generally to hand propelled transportation carts and, more particularly, to a transportation dolly specifically adapted to be utilized with and for transporting a standard pipe vice.

2. Description of the Related Art

Many pipe fitters or other workers require the use of a pipe vice—a heavy, rigid piece of equipment that is used to cut pipes in measured lengths. Difficulties with this device arise when transportation is required; as this piece of equipment weighs over 200 pounds, it can be quite tiring and cumbersome to lug about.

In the related art, many methods of and devices for transporting heavy equipment are known. For example, in U.S. Pat. No. 4,220,346, issued in the name of Geschwender, a utility cart is disclosed comprising a frame with pivoting bed mounted to a wheeled axle. Similarly, in U.S. Pat. No. 2,820,643, issued in the name of Cohn, a hand truck and dolly is disclosed having variable and convertible lengths for adapting to different sized loads. And, in U.S. Pat. No. 1,716,611, issued in the name of Wilson, a truck is disclosed which can be adapted to either two or four wheel operation.

Also known in the related art are devices for transporting heavy equipment which are convertible in orientation or configuration. For example, in U.S. Pat. No. 4,565,382, issued in the name of Sherman, a combined portable table and hand truck is disclosed combining a portable, folding table with the functional elements of a hand truck.

And finally, in U.S. Pat. No. 5,257,892, issued in the name of Branch, a multiple purpose transporting device is disclosed, in which an protruding pipe member is included which can be utilized in aiding an individual in transporting a heavy load, such as a pipe threading machine. However, one drawback of the transportation device as disclosed in the Branch reference is its cumbersome nature when utilized with a pipe vise, as well as the tremendous lifting strength required in order to mount such a pipe vise upon the protruding pipe.

Consequently, a need has been felt for providing an apparatus and method which can aid a user in the transportation and setting up of the heavy, rigid pieces of equipment used by many pipefitters to cut pipes into measured lengths.

SUMMARY OF THE INVENTION

It is therefore an object of the present invention to provide an improved pipe vice transportation dolly.

It is another object of the present invention to provide a transportation dolly which easily facilitates the transportation of a pipe vice.

It is yet another object of the present invention to provide a transportation dolly which also aids in the setting up of a pipe vice.

Finally, it is another object of the present invention to provide a transportation dolly which not only can be used with existing pipe vices, but can also be incorporated into the design of new pipe vices.

It is a feature of the present invention to provide an improved pipe vice transportation dolly having a handle which makes the unit easy to carry while protecting the pipe vice, without interfering in the vice's operation.

Briefly described according to the preferred embodiment of the present invention, a pipe vice transportation dolly is disclosed having a one-piece faceplate which is rigid and stable, and primary and secondary support arms to sustain the pipe vice while providing stability and balance as well. Two wheels protrude from either side and enable it to move the pipe vice about. A face plate is generally triangular and is situated between the wheels with the main support arm centered in the peak of the triangle, and two protruding pipes, secondary support arms, on each end of the plate which attach to the pipe vice's threading arms. A rectangular handle is situated on top and center of the faceplate.

An advantage of the present invention is that it can be used by a single person to easily transport a pipe vice.

Another advantage of the present invention is that it can also be used to aid in the setting up of a pipe vice.

Yet another advantage of the present invention is that it not only can be used with existing pipe vices, but can also be incorporated into the design of new pipe vices.

Further, the preferred embodiment of the present invention can improve safety in the workplace as well as decrease the time required in the setting up of equipment.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
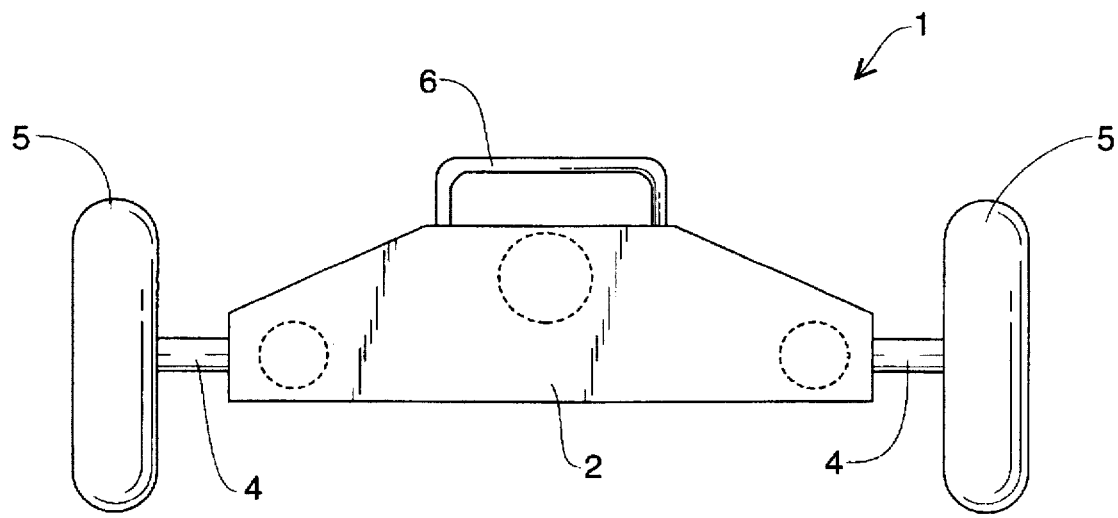
FIG. 1 is a front view of the preferred embodiment of the present invention.
Figure 2:
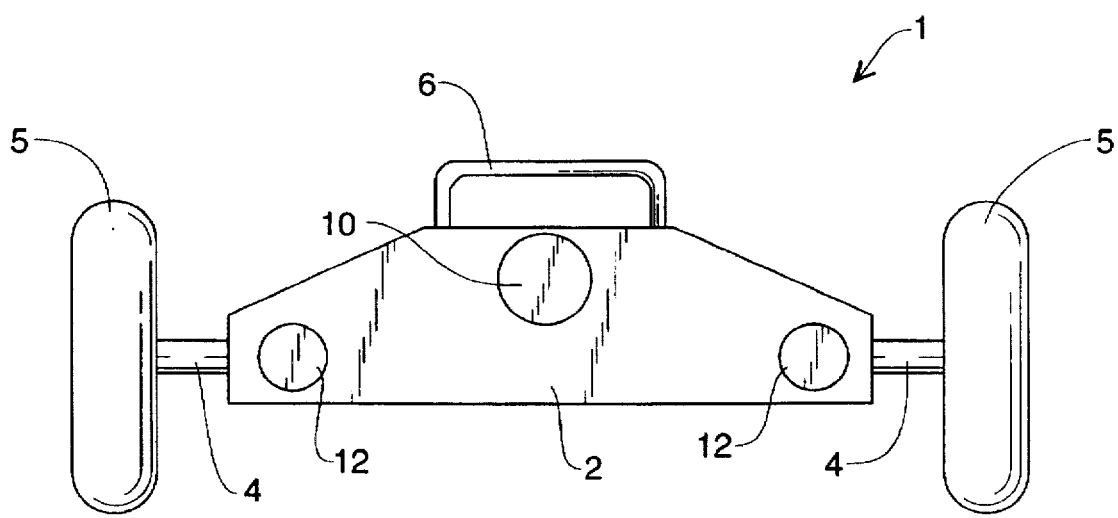
FIG. 2 is a rear view thereof.

Referring now to the figures, a pipe vice transportation dolly 1 is shown, according to the present invention, having a faceplate 2 which provides the main support. As shown in the preferred embodiment, the faceplate 2 is generally triangular. Connected to the sides of the faceplate 2 are a pair of axles 4 supporting rotating wheels 5, connected to the top of the faceplate 2 is a handle 6. The handle 6 is utilized in the setup and tear down when locked to a pipe vice, as is described below, as well as providing impact protection for the portion of the pipe vice known as the Jacobs chuck. Also affixed to and protruding perpendicularly from the faceplate 2 is a primary support arm 10 and a pair of secondary support arms 12. The primary support arm 10 is dimensioned and located to engage into the Jacobs chuck. In such a configuration the Jacobs chuck can then be locked down onto the primary support arm 10, thereby securing the pipe vice. The secondary support arms 12 are dimensioned and located in order to slide into the vice arms 24 and thereby provide lateral support to steady the entire assembly.

2. Operation of the Preferred Embodiment

Figure 3:
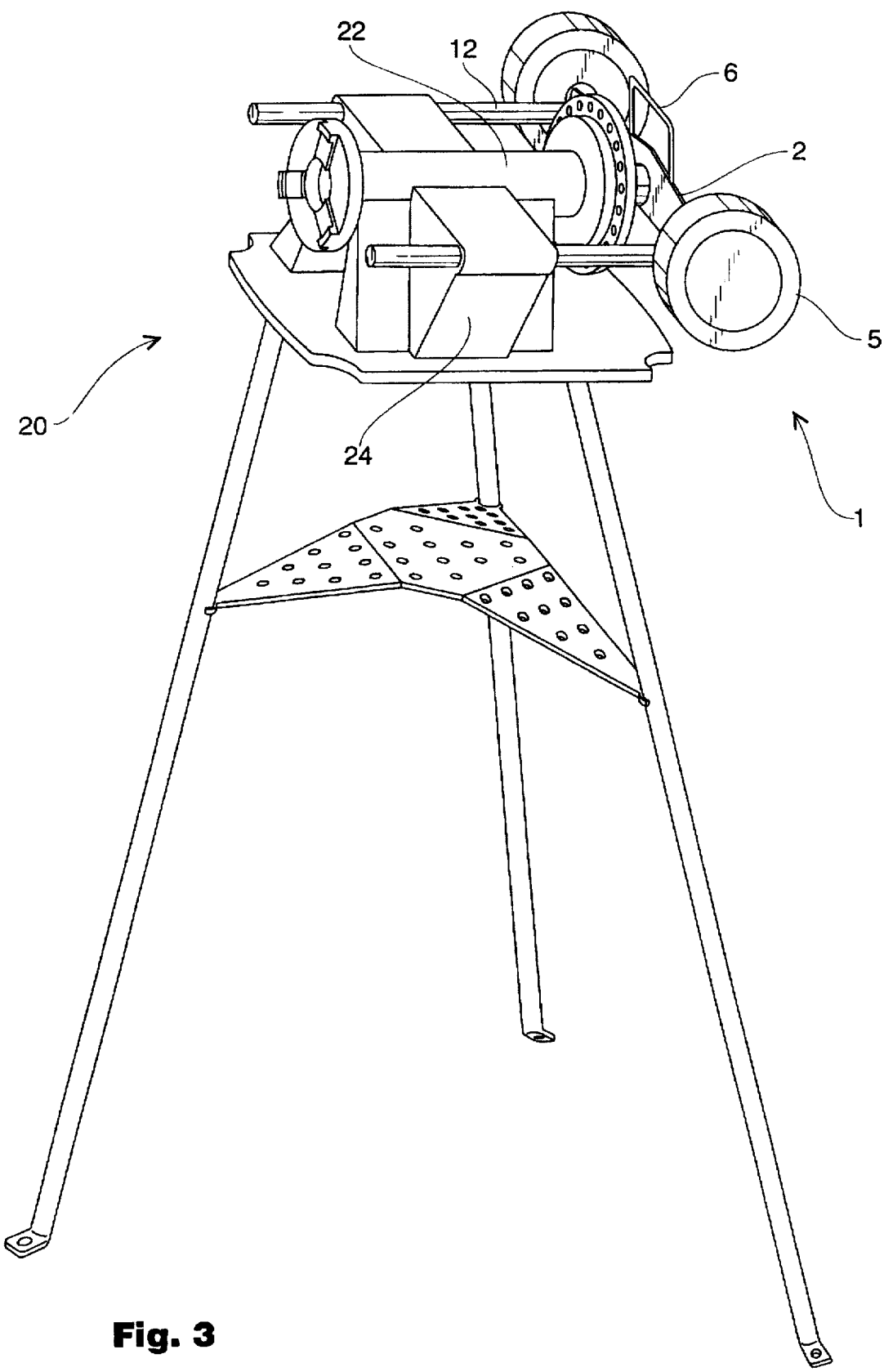
FIG. 3 is a perspective view thereof being utilized with a pipe vice.

To use the present invention with a pipe vice 20 having tripod legs as shown in FIG. 3, a user first must push in the threading arms 24 of the pipe vice and open the Jacobs chuck 22. Then, the secondary support arms 12 are inserted into the pipe vice's threading arms 24, pushing until the primary support arm 10 is well inside the jaws of the Jacobs chuck 22. By tightening the jaws of the Jacobs chuck 22 onto the primary support arm 10, the pipe vice transportation dolly 1 is ready to be used. By using the handle 6, the vice 20 can be leaned forward onto the wheels 5. The tripod legs can be folded together, and the entire unit is now easily transportable in a rolling manner. When use of pipe vice transportation dolly 1 is no longer required, the user may then open the tripod legs, erect the vice, and remove the transportation dolly by reversing the above steps until further employment is desired.

It is currently envisioned that the present invention may be utilized as a separate unit to use with existing vices or incorporated into the design of new pipe vices.

The foregoing description is included to illustrate the operation of the preferred embodiment and is not meant to limit the scope of the invention. The scope of the invention is to be limited only by the following claims.

What is claimed is:

1. A transportation dolly for use with a pipefitter's pipe vice, the pipe vice having a chuck portion with locking chuck jaws and a threading arm positioned along each lateral side of the chuck portion, and supported on a legged frame, said transportation dolly comprising:

a rigid faceplate having two laterally opposed sides, and a front side;

a pair of axle segments, one each protruding outwardly from each of the laterally opposed sides;

a pair of wheels rotatably mounted to the axle segments;

a primary support arm affixed to the faceplate and protruding outwardly from the front side, the primary support arm having a free end portion adapted to be received within the locking jaws of the chuck portion and secured thereto;

a pair of parallel secondary support arms affixed to the faceplate and protruding outwardly from the front side, the secondary support arms having free end portions adapted to be received within openings extending through the threading arms; and a grippable handle mounted to the faceplate and protruding outwardly therefrom, whereby when the dolly is attached to the pipe vice, the pipe vice is supported by the wheels and the legged frame forms a handle for transporting the pipe vice in a rolling manner.

2. A transportation dolly for use with a pipefitter's pipe vice, the pipe vice having a chuck portion with locking chuck jaws and a threading arm positioned along each lateral side of the chuck portion, and supported on a legged frame, said transportation dolly comprising:

a generally triangular shaped rigid faceplate having two laterally opposed sides, a front side, a top, and a bottom forming the base of the triangle;

an axle protruding outwardly from each laterally opposed side comprising two separate axle segments, one each affixed to each said laterally opposed side of said faceplate;

a pair of wheels rotatably mounted to said axle segments;

a primary support arm affixed to said faceplate and protruding perpendicularly outwardly from said front side, said primary support arm having a free end portion adapted to be received within the locking jaws of said chuck portion and secured thereto;

a pair of parallel secondary support arms affixed to said faceplate and protruding perpendicularly outwardly from said front side, said secondary support arms having free end portions adapted to be received within openings extending through said threading arms; and a rectangular, grippable metal handle mounted to said faceplate at said top and protruding upwardly from therefrom, whereby when the dolly is attached to the pipe vice, the pipe vice is supported by the wheels and the legged frame forms a handle for transporting the pipe vice in a rolling manner.

3. The transportation dolly as described in claim 2, wherein said primary support arm comprises a rigid, generally tubular metal bar.

4. The transportation dolly as described in claim 2, wherein each said secondary support arm comprises a rigid, generally tubular metal bar.

5. In a pipe vice for securably holding tubular metal pipes during measuring and cutting having a chuck portion with locking chuck jaws and a threading arm positioned along each lateral side of the chuck portion, and supported on a legged frame, the improvement comprises the addition of a wheeled pipe vice transportation dolly adapted to be releasably locked to said chuck portion and said threading arms, wherein said pipe vice transportation dolly comprises:

a generally triangular shaped rigid faceplate having two laterally opposed sides, a front side, a top, and a bottom forming the base of the triangle;

an axle protruding outwardly from each laterally opposed side comprising two separate axle segments, one each affixed to each said laterally opposed side of said faceplate;

a pair of wheels rotatably mounted to said axle segments;

a primary support arm affixed to said faceplate and protruding perpendicularly outwardly from said front side, said primary support arm having a free end portion adapted to be received within the locking jaws of said chuck portion and secured thereto;

a pair of parallel secondary support arms affixed to said faceplate and protruding perpendicularly outwardly from said front side, said secondary support arms having free end portions adapted to be received within openings extending through said threading arms; and a rectangular, grippable metal handle mounted to said faceplate at said top and protruding upwardly from therefrom, whereby when the dolly is attached to the pipe vice, the pipe vice is supported by the wheels and the legged frame forms a handle for transporting the pipe vice in a rolling manner.

6. The pipe vice transportation dolly as described in claim 5, wherein said primary support arm comprises a rigid, generally tubular metal bar.

7. The pipe vice transportation dolly as described in claim 5, wherein each said secondary support arm comprises a rigid, generally tubular metal bar.

* * * * *